United States Patent
Cherchi

(10) Patent No.: US 12,458,223 B2
(45) Date of Patent: Nov. 4, 2025

(54) INFRARED TELE-VIDEO-OCULOGRAPHY FOR REMOTE EVALUATION OF EYE MOVEMENTS

(71) Applicant: Northwestern University, Evanston, IL (US)

(72) Inventor: Marcello Cherchi, Lincolnwood, IL (US)

(73) Assignee: Northwestern University, Evanston, IL (US)

( * ) Notice: Subject to any disclaimer, the term of this patent is extended or adjusted under 35 U.S.C. 154(b) by 441 days.

(21) Appl. No.: 17/928,545

(22) PCT Filed: Jun. 17, 2021

(86) PCT No.: PCT/US2021/037775
§ 371 (c)(1),
(2) Date: Nov. 29, 2022

(87) PCT Pub. No.: WO2021/257797
PCT Pub. Date: Dec. 23, 2021

(65) Prior Publication Data
US 2023/0210363 A1    Jul. 6, 2023

Related U.S. Application Data

(60) Provisional application No. 63/040,740, filed on Jun. 18, 2020.

(51) Int. Cl.
*A61B 3/113*    (2006.01)
*A61B 3/00*    (2006.01)
(Continued)

(52) U.S. Cl.
CPC ............ *A61B 3/113* (2013.01); *A61B 3/0008* (2013.01); *A61B 3/005* (2013.01); *A61B 3/145* (2013.01);
(Continued)

(58) Field of Classification Search
CPC ....... A61B 3/113; A61B 3/0008; A61B 3/005; A61B 3/145; A61B 3/156; A61B 5/1112;
(Continued)

(56) References Cited

U.S. PATENT DOCUMENTS

| 9,101,296 B2 | 8/2015 | Schroeder et al. |
| 10,635,900 B2 | 4/2020 | Strombom et al. |

(Continued)

OTHER PUBLICATIONS

The International Search Report and the Written Opinion issued on Oct. 4, 2021 for international patent application No. PCT/US2021/037775; pp. 1-8.
(Continued)

*Primary Examiner* — Mohammed A Hasan
(74) *Attorney, Agent, or Firm* — Bell & Manning, LLC

(57) ABSTRACT

Abstract (amended) A system to perform remote oculography includes light-occluding googles configured to be worn by a patient. The light-occluding goggles include an infrared camera positioned to capture one or more first images of a first eye of the patient. The light occluding googles also include a display positioned such that it is viewable by a second eye of the patient. The display is configured to display a pattern for the patient to view. The light occluding googles also include a sensor configured to detect information regarding a position of a head of the patient. The system includes a visible light camera configured to capture one or more second images of the patient as the patient wears the light occluding goggles.

20 Claims, 4 Drawing Sheets

(51) Int. Cl.
 *A61B 3/14* (2006.01)
 *A61B 3/15* (2006.01)
 *A61B 5/11* (2006.01)
(52) U.S. Cl.
 CPC ............ *A61B 3/156* (2013.01); *A61B 5/1112* (2013.01); *A61B 5/1114* (2013.01); *A61B 2562/0219* (2013.01)
(58) Field of Classification Search
 CPC .......... A61B 5/1114; A61B 2562/0219; A61B 3/0025; A61B 5/0059; A61B 5/1104; A61B 3/08; A61B 5/6814; G06V 2201/03; G06V 10/141; G06V 10/143; G06V 40/19; G06V 40/193
 USPC ........................................................ 351/206
 See application file for complete search history.

(56) References Cited

U.S. PATENT DOCUMENTS

| | | | | |
|---|---|---|---|---|
| 2011/0077548 | A1* | 3/2011 | Torch | A61B 5/165 600/558 |
| 2016/0007849 | A1* | 1/2016 | Krueger | A61B 5/1128 600/301 |
| 2016/0262608 | A1* | 9/2016 | Krueger | G16H 40/63 |
| 2016/0370583 | A1* | 12/2016 | Saarikko | G02B 6/34 |
| 2017/0258325 | A1* | 9/2017 | Carrick | A61B 3/0041 |
| 2023/0037329 | A1* | 2/2023 | Erkelens | G06F 3/011 |
| 2023/0172507 | A1* | 6/2023 | Lewkowski | A61B 3/113 600/558 |

OTHER PUBLICATIONS

VisualEyes™ Micromedical by Interacoustics; pp. 1-15. Product Visual Eyes: VisualEyes™ 525, VisualEyes™ 515, VisualEyes™ 505, VisualEyes™ EyeSeeCam, Vorteq™ Assessment and Vorteq™ Diagnostic, VisualEyes™ software and EyeSeeCam vHIT system, VisualEyes™ FireWire®, and VisualEyes™ VNG. Retrieved from internet on Nov. 23, 2022. https://www.interacoustics.com/balance-testing-equipment/visualeyes.

"EyeSeeCam vHIT;" pp. 1-8. Retrieved from internet on Nov. 23, 2022. Product EyeSeeCam: https://www.interacoustics.com/balance-testing-equipment/eyeseecam-vhit.

* cited by examiner

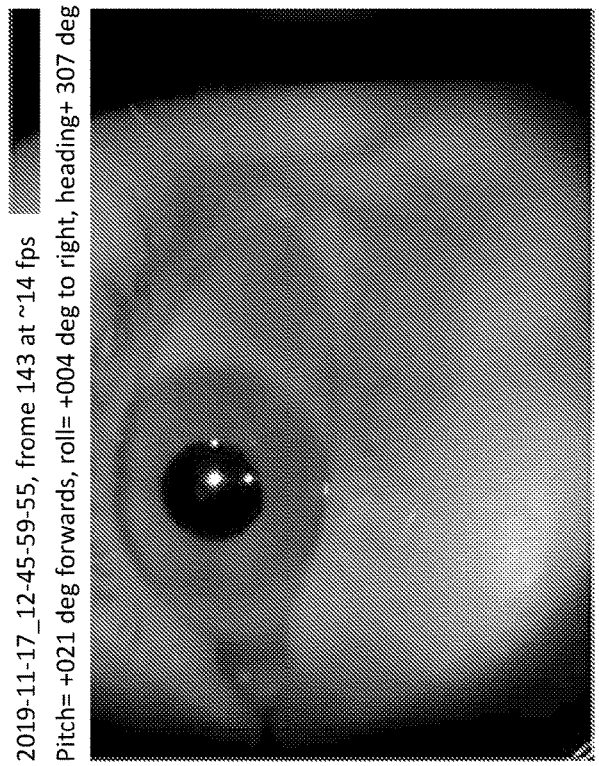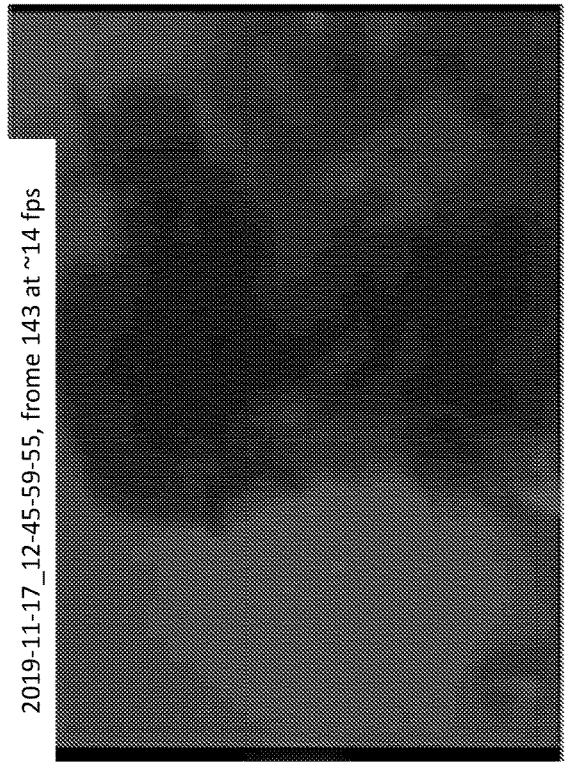
Fig. 1A
Fig. 1B of the patient. The light-occluding goggles also include a sensor configured to detect information regarding a position of a head of the patient. The system also includes a visible light camera configured to capture one or more second images of the patient as the patient wears the light-occluding goggles.

The system can also include a transceiver to transmit the first one or more images of the first eye of the patient and the second one or more images of the patient to a remote computing system. In some embodiments, the transceiver is further configured to transmit the information regarding the position of the head of the patient to the remote computing system. The system can also include a speaker configured to emit verbal instructions to the patient regarding operation of the system and the transceiver can be configured to receive the verbal instructions from a remote computing system.

The sensor can be a magnetometer configured to generate information regarding a direction that the head of the patient is facing. The sensor can also be an accelerometer configured to generate information regarding a linear acceleration or an angular acceleration of the head of the patient. The sensor can also be a gyroscope configured to generate information regarding angular movement of the head of the patient.

The system can also include an infrared illuminator configured to direct infrared light onto the first eye of the patient such that the one or more first images capture a response of the first eye of the patient to the infrared light. In some embodiments, the system includes a global positioning system mounted to the light-occluding goggles, where the global position system determines a location of the patient. The system can also include a lens positioned between the second eye of the patient and the display. The display can be configured to present textual instructions to the patient regarding operation of the system. The system can further include a processor configured to determine results of an eye examination by processing of the one or more first images, the one or more second images, and the information regarding the position of the head of the patient.

An illustrative method of performing a remote eye examination includes capturing, by an infrared camera mounted within light-occluding goggles, one or more first images of a first eye of the patient. The method also includes displaying, on a display mounted within the light-occluding goggles, a pattern that is viewable by a second eye of the patient. The method also includes detecting, by a sensor mounted to the light-occluding goggles, information regarding a position of a head of the patient. The method further includes capturing, by a visible light camera, one or more second images of the patient as the patient wears the light-occluding goggles.

The method can also include processing, by a processor, the one or more first images, the one or more second images, and the information regarding the position of the head of the patient to determine results of an eye examination performed on the patient. In some embodiments, the sensor comprises a magnetometer, and the method further includes capturing, by the magnetometer, information regarding a direction that the head of the patient is facing. In some embodiments, the sensor comprises an accelerometer, and the method further includes capturing, by the accelerometer, information regarding a linear acceleration or an angular acceleration of the head of the patient.

In some embodiments, the method further includes determining, by a global position system mounted to the light-occluding goggles, a location of the patient. The method can also include directing, by an infrared illuminator mounted within the light-occluding goggles, infrared light onto the first eye of the patient such that the one or more first images capture a response of the first eye of the patient to the infrared light.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A is a depiction of infrared video of the patient's eye in accordance with an illustrative embodiment.

FIG. 1B is a depiction is a depiction of an image from the external (visible light) camera viewing the patient's eye in accordance with an illustrative embodiment.

DETAILED DESCRIPTION

Figure 1C:
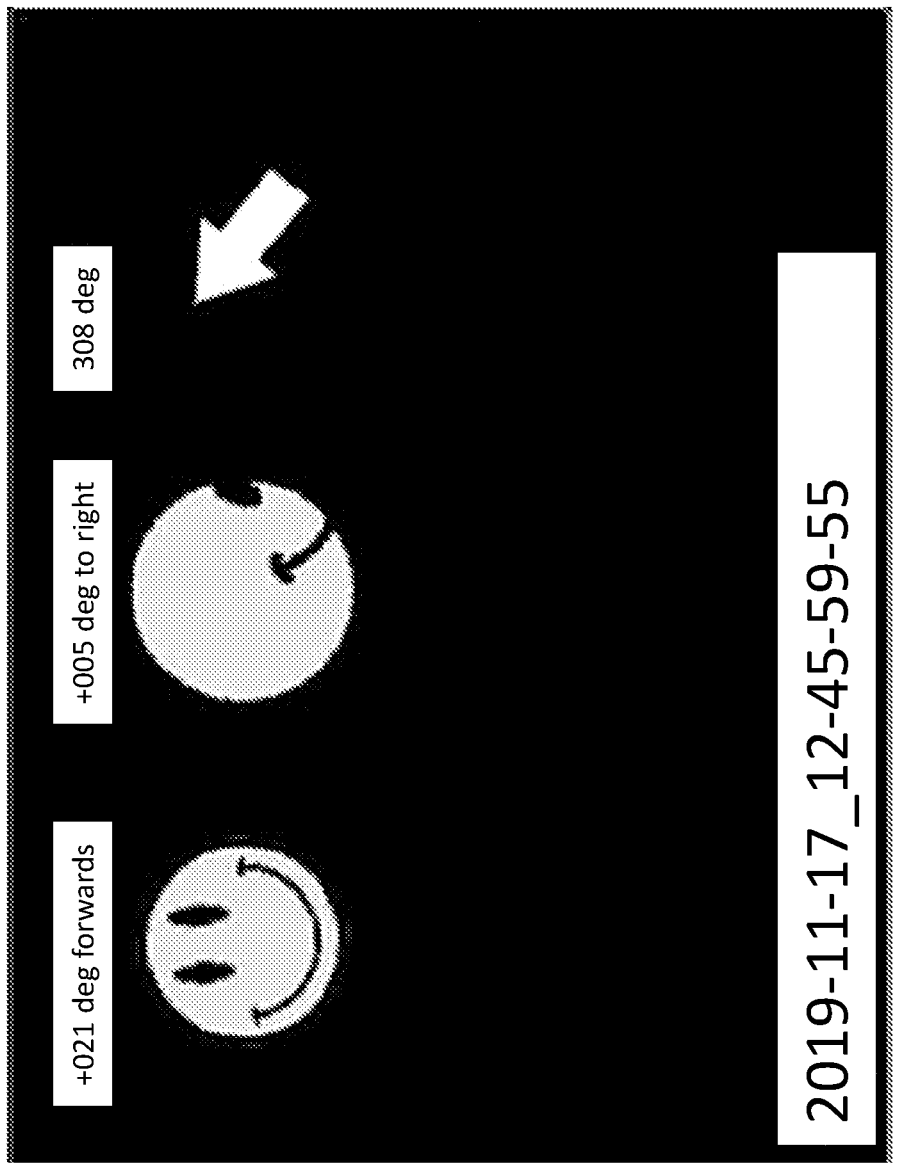
FIG. 1C is a depiction of the position (pitch and roll from the accelerometer) and orientation (yaw, inferred by compass direction from the magnetometer) of the patient's head in accordance with an illustrative embodiment.

Observation of eye movements is essential in the diagnosis, monitoring, and management of a broad range of vestibular disorders (diseases affecting balance). Ideally, this examination should be conducted so that the eye movements of the patient can be examined i) in the dark, ii) with the patient following visual targets, iii) with knowledge of the position and orientation of the patient's head and body, iv) with the patient following specific instructions, and v) with the data from the examination transmittable to a remote examiner.

The current public health crisis (COVID-19 pandemic) has highlighted the fact that remote infrared video-oculography (with a full set of features as described herein) would be extraordinarily helpful in telehealth-mediated diagnosis, monitoring, and management of patients with a variety of vestibular disorders. A remote infrared video-oculography system could be deployed in the dwelling of the patient. The proposed system can, with equal feasibility, be deployed in a medical setting (such as an emergency room) where a vestibular specialist is not readily available.

Traditional oculography systems are intended for use only within a vestibular clinic, and require medical personnel to be physically present. Such traditional systems do not provide instructions to the patient, as they are not even intended for use outside of the clinic. Traditional systems also lack the appropriate hardware (e.g., an accelerometer and a magnetometer) to automatically monitor patients, and they do not include an external visible light camera aimed at the patient. Traditional systems also do not transmit data to a remote examiner. Additionally, the use of only visible light (rather than infrared) to record eye movements in traditional systems limits the diagnostic capabilities of the systems. Described herein is a remote video-oculography system that cures the defects of traditional systems. Specifically, the proposed system can be used remotely in a patient's home or elsewhere outside of a clinic setting, and does not require a specialist to be present during system use. The proposed system also introduces infrared light testing to increase the overall diagnostic capabilities of the system.

In an illustrative embodiment, the proposed system can include light-occluding goggles that are worn by the patient and to which a number of devices are attached. For example, one or more infrared cameras (aimed at the patient's eye(s)) and one or more infrared illuminators can be incorporated into the system and used for parts of the examination that require the patient to feel as if s/he is in the dark. The reason is that when patients can see, they visually fixate, and such visual fixation interferes with these parts of the examination by suppressing a variety of eye movements and provoking others. The use of infrared light in conjunction with image processing provides significantly enhanced contrast in the proposed system as compared to the use of visible light in traditional systems. For example, a variety of mathematical convolutions and algorithms can be applied to each image to accentuate various features (e.g., contrast limited histogram equalization, edges, shapes, etc.) in different ways, and such processing can be performed on infrared images and visible light images to detect ocular torsion, etc. The infrared camera can be mounted over (and aimed at) one of the patient's eyes. In an illustrative embodiment, the infrared camera can be used to capture video, and the higher the video's temporal resolution (frame rate) and spatial resolution (graphical resolution), the better the graphical capabilities of the system. In one embodiment, the minimum frame rate can be 30 Hertz (Hz), but other values may be used in alternative embodiments, such as 60 Hz, 120 Hz, 240 Hz, etc.

Other sections of the test involve the patient following visual targets with his/her eyes. The system thus includes a screen (i.e., a display) that displays various patterns visible to the patient. The screen can be an organic light-emitting diode (OLED) screen capable of displaying true black in one embodiment, or alternatively a different type of screen may be used. This small screen can be mounted over the patient's other eye with an interposed convex lens such that the patient can view the screen with one eye while the other eye is examined by infrared light.

When analyzing eye movements it is also important to know the orientation of the patient's head with respect to gravity. As such, the system can include an accelerometer mounted to the goggles to determine orientation of the head of the patient. A gyroscope can also be included alone or in combination with the accelerometer. It is also helpful to know the direction in which the patient is facing. To obtain such directional information, the system can include a magnetometer, which can also be mounted to the goggles. In some embodiments, the system can also include a global positioning system (GPS) chip such that the (remote) physician can use to verify/determine the location of the patient that he/she is examining. This can be helpful because some physicians can only practice in specific jurisdictions (e.g., a certain state or states), and the GPS chip can help ensure that the physician is treating a patient within his/her approved jurisdiction.

For some parts of the test it is also helpful to know the position of the patient's body. To obtain body position information, the system can include an external visible light camera that is positioned to view the patient. The visible light camera can be used to capture video of the patient's body. The system also includes a speaker that is configured to emit verbal instructions for use of the system. This allows the patient to use the system when s/he is alone. The speaker can be mounted in or on the goggles or the external camera. Alternatively, or additionally, the instructions can be presented to the user as text on the display screen prior to commencement of testing or during testing.

In an illustrative embodiment, the system also includes a transceiver configured to remotely communicate with a remote location (e.g., medical clinic, remote server, hospital, etc.) to convey test results from the system for the review and consideration of medical personnel. As such, remote processing of obtained data can be performed at the remote location using a store and forward approach with the obtained data. The system can also receive data from the remote location such as verbal instructions from medical personnel, a video feed of the medical personnel, software updates, etc.

Thus, in an illustrative embodiment, the proposed system includes (1) light-occluding goggles; (2) a small infrared camera (and illuminator) placed over one of the patient's eyes and viewing that eye; (3) an OLED screen placed over the patient's other eye; (4) an accelerometer, magnetometer, and/or gyroscope rigidly affixed to the goggles; (5) an external visible-light camera (viewing the patient) that connects to the system; (6) a speaker to emit verbal instructions in the event that a patient is alone; (7) a transceiver to transmit the results of the tests (via a secure, HIPAA-compliant communication connection) to a remote examiner.

The system also includes a computing device having a processor, memory, transceiver, interface, etc. The computing device can be incorporated into the goggles and/or the external camera. Alternatively, a standalone computing device in communication with the goggles and external camera can be used. The computing device controls output (what is displayed on the screen and what verbal instructions are emitted) and synchronously collects information from the devices (infrared camera, visible light camera, accelerometer, and magnetometer). The computing device can also transmit this information to a remote server or other remote computing system for processing and analysis.

In one embodiment, the computing device can be a central computer (e.g., a Raspberry Pi 4B+, but alternatively a different computer may be used such as a smart phone, tablet, laptop computer, etc.). This central computer can be connected by electronic cables or wirelessly to the components attached to the set of light-occluding goggles (a prototype of the system uses a modified set of SCUBA goggles). Over one eye of the goggles is embedded an infrared camera (the prototype uses a Smraza Night Vision camera, but others can alternatively be used) aimed at the patient's eye, and an infrared illuminator of the appropriate wavelength. The camera is therefore able to acquire infrared images of sufficient spatial and temporal resolution. Over the other eye is a small OLED screen (capable of displaying true black) that is viewable by the patient, with a distance lens (similar to that used in virtual reality goggles) between the screen and the patient's eye. The system can be powered by a standard wall outlet and/or by one or more batteries such that the system is portable and can be used at a location without grid power.

Rigidly attached to the goggles are an accelerometer and magnetometer (the prototype uses a composite Ozzmaker BerryIMU-v3, but others can alternatively be used). A gyroscope may also be rigidly attached to the goggles. The computer also connects to a visible-light web camera aimed at the patient such that the examiner can see the patient's head/body orientation and position. The computer can emit pre-recorded verbal instructions for the patient, leading them through the various positions and maneuvers needed for the examination. Finally, once the data are acquired, they can be transmitted to a remote examiner via a secure, HIPAA-compliant protocol (e.g., a "store-and-forward" format telehealth implementation). In some embodiments, the proposed system can include custom image processing software to capture torsional movement of the eye such that the torsional movement can be analyzed. An example (screen shot) of the data collected via the prototype is displayed at FIGS. 1A-1C.

Specifically, FIG. 1A is a depiction of infrared video of the patient's eye in accordance with an illustrative embodiment. FIG. 1B is a depiction of an image from the external (visible light) camera viewing the patient's eye in accordance with an illustrative embodiment. FIG. 1C is a depiction of the position (pitch and roll from the accelerometer) and orientation (yaw, inferred by compass direction from the magnetometer) of the patient's head in accordance with an illustrative embodiment. FIGS. 1A-1C represent a single "snapshot" of a composite of three synchronously collected video displays.

Figure 2:
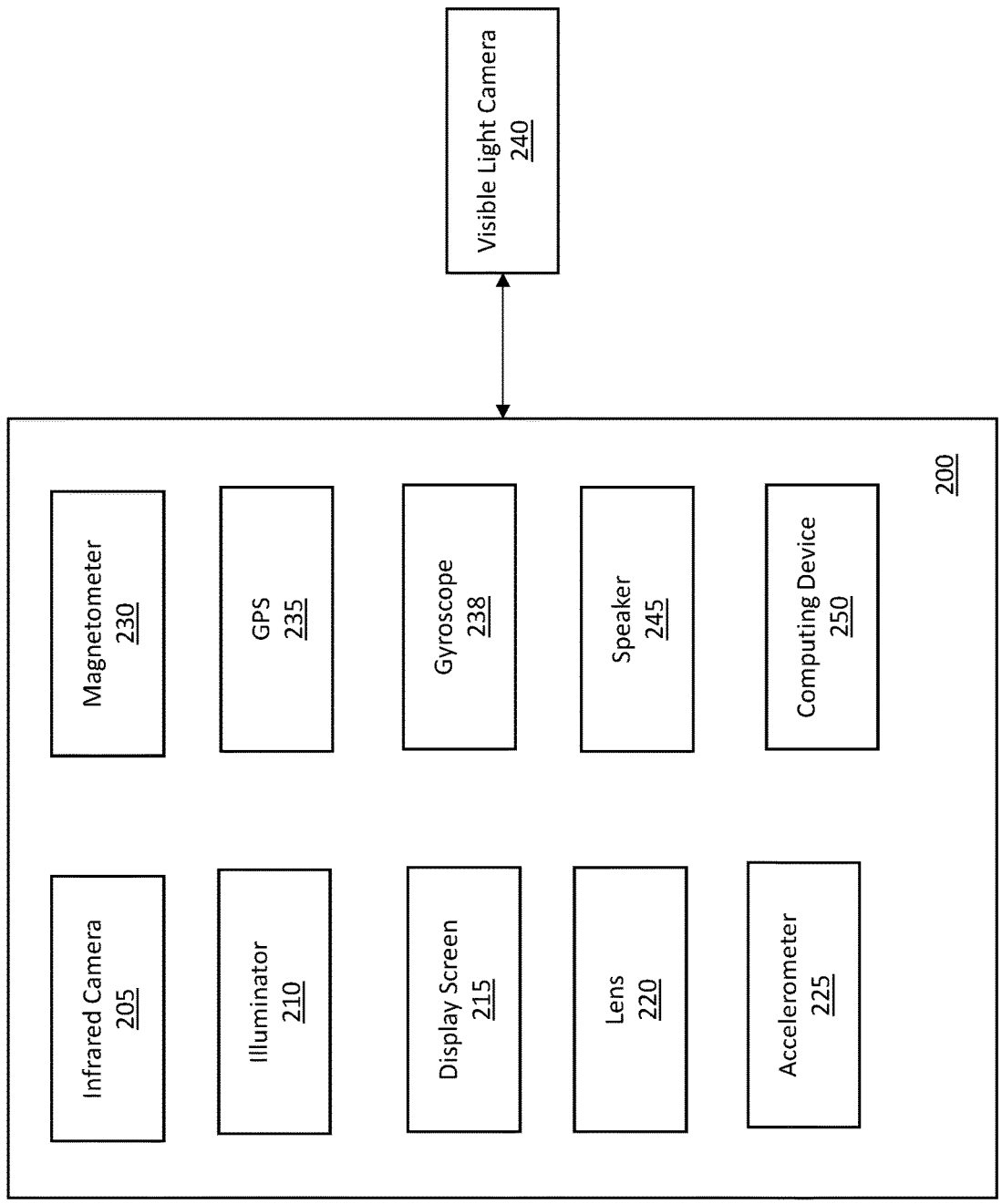
FIG. 2 is a block diagram of the system in accordance with an illustrative embodiment.

FIG. 2 is a block diagram of the system in accordance with an illustrative embodiment. The system includes a housing in the form of goggles 200, and in an illustrative embodiment the components of the system are mounted to or otherwise incorporated into the goggles 200. In some embodiments, the various components of the system can be detachable from the goggles 200 or otherwise separate therefrom. In an illustrative embodiment, the goggles 200 are light occluding such that ambient light from the patient's surroundings does not interfere with use of the system. The goggles 200 can include a strap or band to secure the goggles 200 to the head of the patient such that the patient can use the device hands free. Any type of light occluding goggles may be used.

The system also includes an infrared camera 205, an infrared illuminator 210, a display screen 215, a lens 220, an accelerometer 225, a magnetometer 230, a global positioning system (GPS) 235, a gyroscope 238, a visible light camera 240, a speaker 245, and a computing device 250. In alternative embodiments, the system may include fewer, additional, and/or different components, depending on the implementation. The infrared camera 205 and the infrared illuminator 210 are used to capture infrared images, which in turn are analyzed to determine how the eye of the patient responds to a dark setting in which visible light is not present. Specifically, the infrared illuminator 210 can be mounted in the goggles 200 such that it directs infrared radiation toward the eye of the user. The infrared camera is mounted in the goggles 200 such that it captures the response of the eye to the infrared radiation in the form of infrared images and video. The captured response can be stored in a memory of the computing system 250 for processing and/or transmission to a remote location.

The display screen 215 and the (interposed) lens 220 can be mounted in the goggles such that they are positioned over the other eye of the patient (i.e., the eye of the patient that is not covered by the infrared camera 205 and the infrared illuminator 210). As discussed, the display screen 215 can be an OLED screen in an illustrative embodiment. Alternatively, a different type of display screen may be used such as a standard light-emitting diode (LED) screen, a liquid crystal display (LCD) screen, a plasma screen, etc. The lens 220 can be a convex distance lens that is mounted in the goggles such that the lens 220 is positioned between the eye of the patient and the display screen 215. The lens 220 is used to help ensure that the patient is able clearly see the images, text, colors, etc. presented on the display screen 215. In an illustrative embodiment, the display screen 215 is used to present textual instructions to the patient regarding operation of the system and performance of the specific tests administered by the system. The display screen 215 can also be used to present images, colors, shapes, etc. to the patient to test the patient's response thereto.

Also mounted to the goggles 200 are an accelerometer 225, a magnetometer 230, a GPS 235, and a gyroscope 238 for use in identifying and monitoring movements of the patient during testing. As discussed, in some alternative embodiments, any one or more of the accelerometer 225, magnetometer 230, GPS 235, and the gyroscope 238 may be omitted from the goggles 200. The accelerometer 225 is used to identify changes in speed and/or acceleration of the patient's head during an examination. The magnetometer 230 is used to measure changes in the strength and direction of the earth's magnetic field proximate to the goggles 200, and this information can be used to determine the direction and orientation of the patient's head. The GPS 235 includes a transceiver that communicates with a system of remote satellites to determine a location of the patient, which can be used to confirm that the patient is within an allowable jurisdiction. The gyroscope 238 can be used to determine the amount of rotation and other angular motion of the patient's head. Readings from the accelerometer 225, the magnetometer 230, the GPS 235, and the gyroscope 238 can be stored in a memory of the computing device 250 for processing and/or transmission to a remote location.

Also included in the system is the visible light camera 240. In one embodiment, the visible light camera 240 can be mounted external to the goggles 200 such that it is able to capture images of the eye, head, body, etc. orientation and position of the patient. The captured images and video can be stored in a memory of the computing device 250 for processing and/or transmission to a remote location. In one embodiment, the speaker 245 is mounted to the goggles 200 and used to provide verbal instructions to the patient prior to and during use of the system. Alternatively, the speaker 245 can be incorporated into the visible light camera 240 or a different component of the system. The computing device 250 can also be incorporated into the goggles 200 and in communication with the other system components. Alternatively, the computing device 250 may be remote from the goggles 200, but in wired or wireless communication therewith. An illustrative computing device is described in more detail below with reference to FIG. 3.

In an illustrative embodiment, the goggles 200 can be used to test and monitor either of the patient's eyes. As such, in some embodiments, the system can include two appliances. The first appliance can include the infrared illuminator 210 and the infrared camera 205, and the second appliance can include the display screen 215 and the lens 220. The goggles 200 can be configured such that the first appliance can be placed over the right eye or the left eye of the patient. Similarly, the goggles 200 allow for the second appliance to be positioned over the opposite eye of the patient (i.e., either the right eye or left eye depending on the position of the first appliance). As an example, a first eye of the patient may have poor vision and a second eye of the patient may have better vision (compared to the first eye). In such a scenario, the first appliance (i.e., infrared illuminator 210 and infrared camera 205) can be placed over the first eye with poor vision. The second appliance (i.e., display screen 215 and lens 220) can be placed over the second eye to take advantage of the better sight in the second eye such that the patient is able to more clearly see the imagery on the display screen 215. Positions of the first appliance and the second appliance within the goggles 200 can be changed manually by the patient (or physician) in some embodiments. Alternatively, one or more actuators can be positioned in the goggles 200 and used to move the first appliance from a first position over a first eye to a second position over a second eye, and vice versa. Similarly, one or more actuators can be used to move the second appliance from a first position (e.g., over the second eye) to a second position (e.g., over the first eye), and vice versa.

In one embodiment, the system can include a binocular camera arrangement in which the system includes two of the first appliances (infrared illuminator 210 and infrared camera 205), one of which is mounted over each eye of the patient. In such a configuration, it is still desirable to display images to the patient on a display screen as described herein. The system can thus include both an image-displaying path to display images from the display screen 215 and an image-acquisition path (i.e., that includes the infrared camera) that are split and merged using a prism or a half-silvered mirror that specifically reflects infrared wavelengths but transmits visible light wavelengths.

Figure 3:
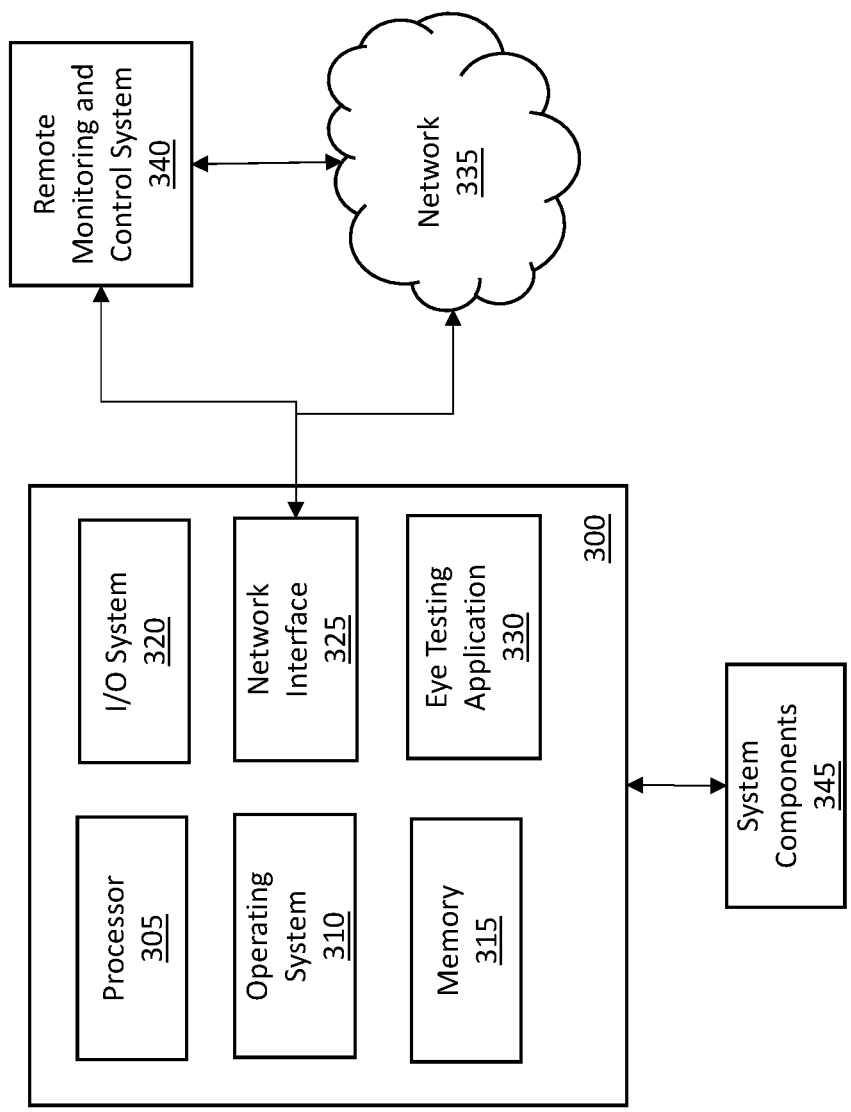
FIG. 3 is a block diagram of a computing device 300 for use in the proposed system in accordance with an illustrative embodiment.

FIG. 3 is a block diagram of a computing device 300 for use in the proposed system in accordance with an illustrative embodiment. FIG. 3 depicts the computing device 300 in communication with a network 335 and a remote monitoring and control system 340. The remote monitoring and control system 340 can be any type of computing device, and can include a processor, memory, transceiver, user interface, etc.

As discussed, the remote monitoring and control system 340 can be used by a physician to remotely monitor and control the computing device 300. The computing device 300 is also in local communication with the other system components 345, such as the infrared camera, the illuminator, the display screen, the lens, the accelerometer, the magnetometer, the global positioning system (GPS), the gyroscope, the visible light camera, the speaker, etc. The computing device 300 includes a processor 305, an operating system 310, a memory 315, an input/output (I/O) system 320, a network interface 325, and an eye testing application 330. In alternative embodiments, the computing device 300 may include fewer, additional, and/or different components.

The components of the computing device 300 communicate with one another via one or more buses or any other interconnect system. The computing device 300 can be any type of networked computing device, and can be implemented as a standalone computing system incorporated into the goggles. In an alternative embodiment, the computing device 300 may be incorporated into one of the other system components such as the infrared camera, the visible light camera, the GPS, etc.

The processor 305 can be in electrical communication with and used to control any of the system components described herein. For example, the processor can be used to control the infrared camera, the illuminator, the display screen, a position of the distance lens, the accelerometer, the magnetometer, the global positioning system (GPS), the gyroscope, the visible light camera, the speaker, etc. In some embodiments, any of the system components 345 can include one or more actuators and the processor 305 can control the one or more actuators to control movement of the system components 345. The processor 305 can be any type of computer processor known in the art, and can include a plurality of processors and/or a plurality of processing cores. The processor 305 can include a controller, a microcontroller, an audio processor, a graphics processing unit, a hardware accelerator, a digital signal processor, etc. Additionally, the processor 305 may be implemented as a complex instruction set computer processor, a reduced instruction set computer processor, an x86 instruction set computer processor, etc. The processor 305 is used to run the operating system 310, which can be any type of operating system.

The operating system 310 is stored in the memory 315, which is also used to store programs, patient data, sensor readings, network and communications data, peripheral component data, the eye testing application 330, and other operating instructions. The memory 315 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 315 can be in the cloud to provide cloud storage for the system. Similarly, in one embodiment, any of the computing components described herein (e.g., the processor 305, etc.) can be implemented in the cloud such that the system can be run and controlled through cloud computing.

The I/O system 320 is the framework which enables patients and peripheral devices to interact with the computing device 300. The I/O system 320 can include one or more displays (e.g., the display screen described herein), one or more speakers (e.g., the speaker described herein), one or more buttons or other controls, etc. that allow the patient to interact with and control the computing device 300 and/or the system components 345. The I/O system 320 also includes circuitry and a bus structure to interface with peripheral computing devices such as power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc.

The network interface 325 includes transceiver circuitry (e.g., a transmitter and a receiver) that allows the computing device 300 to transmit and receive data to/from other devices such as the remote monitoring and control system 340, the other system components 345, other remote computing systems, servers, websites, etc. The data transmitted to the remote monitoring and control system 340 can include detected acceleration data, detected magnetometer data (magnetic field strength and orientation), detected gyroscope data, captured infrared images or video, captured visible light camera images or video, audio from the user, GPS sensor data, etc. The data received from the remote monitoring and control system 340 can include indication of a type of eye test to be performed by the patient, system settings and parameters, system updates, etc. The network interface 325 enables communication through the network 335, which can be one or more communication networks. The network 335 can include a cable network, a fiber network, a cellular network, a wi-fi network, a landline telephone network, a microwave network, a satellite network, etc. The network interface 325 also includes circuitry to allow device-to-device communication such as Bluetooth® communication.

The eye testing application 330 can include software and algorithms in the form of computer-readable instructions which, upon execution by the processor 305, performs any of the various operations described herein such as initializing the system, administering eye tests, displaying images, colors, etc. for the user to view, obtaining sensor readings from the various system sensors, processing received remote instructions, processing selections and inputs from the patient, processing captured image and sensor data, sending captured imagery and/or other results to the remote monitoring and control system 340, etc. The eye testing application 330 can utilize the processor 305 and/or the memory 315 as discussed above. In an alternative implementation, the eye testing application 330 can be remote or independent from the computing device 300, but in communication therewith.

Thus, the methods and systems described herein can be used for remote evaluation, monitoring, and management of patients with a broad variety of eye movement disorders. The proposed system improves on traditional systems by providing a solution that allows the patient to remain at his/her home to conduct eye tests, while still allowing for a physician to remotely monitor the patient, control the testing, and analyze results of the testing. The proposed system also incorporates infrared testing to expand upon the overall effectiveness and utility of the system.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to perform remote oculography comprising:
    light-occluding goggles configured to be worn by a patient, wherein the light-occluding goggles include:
    an infrared camera positioned to capture one or more first images of a first eye of the patient;
    a display positioned such that it is viewable by a second eye of the patient, wherein the display is configured to display a pattern for the patient to view; and
    a sensor configured to detect information regarding a position of a head of the patient; and
    a visible light camera configured to capture one or more second images of a position of a body of the patient as the patient wears the light-occluding goggles.

2. The system of claim 1, further comprising a transceiver to transmit the first one or more images of the first eye of the patient and the second one or more images of the patient to a remote computing system.

3. The system of claim 2, wherein the transceiver is further configured to transmit the information regarding the position of the head of the patient to the remote computing system.

4. The system of claim 1, further comprising:
    a transceiver configured to receive verbal instructions from a remote computing system; and
    a speaker configured to emit the verbal instructions to the patient regarding operation of the system.

5. The system of claim 1, wherein the sensor comprises a magnetometer configured to generate information regarding a direction that the head of the patient is facing.

6. The system of claim 1, wherein the sensor comprises an accelerometer configured to generate information regarding a linear acceleration or an angular acceleration of the head of the patient.

7. The system of claim 1, wherein the sensor comprises a gyroscope configured to generate information regarding angular movement of the head of the patient.

8. The system of claim 1, further comprising an infrared illuminator configured to direct infrared light onto the first eye of the patient.

9. The system of claim 8, wherein the one or more first images capture a response of the first eye of the patient to the infrared light.

10. The system of claim 1, further comprising a global positioning system mounted to the light-occluding goggles, wherein the global position system determines a location of the patient.

11. The system of claim 1, further comprising a lens positioned between the second eye of the patient and the display.

12. The system of claim 1, wherein the display is configured to present textual instructions to the patient regarding operation of the system.

13. The system of claim 1, further comprising a processor configured to determine results of an eye examination by processing of the one or more first images, the one or more second images, and the information regarding the position of the head of the patient.

14. A method of performing a remote eye examination, the method comprising:
   capturing, by an infrared camera mounted within light-occluding goggles, one or more first images of a first eye of the patient;
   displaying, on a display mounted within the light-occluding goggles, a pattern that is viewable by a second eye of the patient;
   detecting, by a sensor mounted to the light-occluding goggles, information regarding a position of a head of the patient; and
   capturing, by a visible light camera, one or more second images of a position of a body of the patient as the patient wears the light-occluding goggles.

15. The method of claim 14, further comprising storing, in a memory, the one or more first images, the one or more second images, and the information regarding the position of the head of the patient.

16. The method of claim 15, further comprising processing, by a processor in communication with the memory, the one or more first images stored in the memory, the one or more second images stored in the memory, and the information regarding the position of the head of the patient stored in the memory to determine results of an eye examination performed on the patient.

17. The method of claim 14, wherein the sensor comprises an accelerometer, and further comprising capturing, by the accelerometer, information regarding a linear acceleration or an angular acceleration of the head of the patient.

18. The method of claim 14, further comprising determining, by a global position system mounted to the light-occluding goggles, a location of the patient.

19. The method of claim 14, further comprising directing, by an infrared illuminator mounted within the light-occluding goggles, infrared light onto the first eye of the patient such that the one or more first images capture a response of the first eye of the patient to the infrared light.

20. A system to perform remote oculography comprising:
   light-occluding goggles configured to be worn by a patient, wherein the light-occluding goggles include:
   an infrared camera positioned to capture one or more first images of a first eye of the patient;
   a display positioned such that it is viewable by a second eye of the patient, wherein the display is configured to display a pattern for the patient to view, and wherein the infrared camera captures the one or more images of the first eye of the patient while the display displays the pattern to the second eye of the patient; and
   a sensor configured to detect information regarding a position of a head of the patient; and
   a visible light camera configured to capture one or more second images of the patient as the patient wears the light-occluding goggles.

* * * * *